United States Patent [19]
Verbiest et al.

[11] Patent Number: 5,155,592
[45] Date of Patent: Oct. 13, 1992

[54] IMAGE PROCESSING SYSTEM

[75] Inventors: Willem J. A. Verbiest, Zwijndrecht; Frank O. Van der Putten, Dendermonde; Bart F. Voeten, Beerse, all of Belgium

[73] Assignee: Alcatel N.V., Amsterdam, Netherlands

[21] Appl. No.: 597,893

[22] Filed: Oct. 15, 1990

[51] Int. Cl.⁵ .............................................. H04N 7/133
[52] U.S. Cl. .................................... 358/133; 358/135
[58] Field of Search ............... 358/133, 135, 12, 13

[56] References Cited

U.S. PATENT DOCUMENTS

| | | | |
|---|---|---|---|
| 4,933,762 | 6/1990 | Guichard. et al. | 358/133 |
| 4,982,282 | 1/1991 | Saito | 358/133 |
| 4,984,076 | 1/1991 | Watanabe | 358/12 |
| 5,001,559 | 3/1991 | Gonzales | 358/133 |
| 5,006,931 | 4/1991 | Shirota | 358/133 |
| 5,047,852 | 9/1991 | Hanyu | 358/133 |
| 5,049,990 | 9/1991 | Kondo | 358/133 |
| 5,063,608 | 11/1991 | Siegel | 358/133 |

FOREIGN PATENT DOCUMENTS 0321318  6/1989  European Pat. Off. .

OTHER PUBLICATIONS

Wang et al, "Progressive Image Transmission by Transform Coefficient Residual Error Quantization", *IEEE Trans Communications*, vol. 36 #1, Jan. 1988, pp. 75–87.
Gonsalves et al, "Bounded-error coding of cosine transformed images", *Proc Soc Photo-Optical Instr Engrs* (SPIE) vol. 207, Aug. 1979, pp. 291–298.
Shri K. Goval et al: "Entropy Coded Differential Pulse-Code Modulation Systems for Television" *IEEE Transactions on Communications* Jun. 1975, pp. 660–666.
Wen-Chen et al: "Adaptive coding of Monchrome and Color Images", *IEEE Transactions on Communications*, vol. Com-25, No. 11, Nov. 1977.

*Primary Examiner*—Howard W. Britton
*Attorney, Agent, or Firm*—Brunell & May

[57] ABSTRACT

An image signal (V1) is transform coded in a Discrete cosine Transform Coder (DCT) and the output coefficients thus provided are encoded in a zonal encoder (QZ). The output of QZ is inversely coded (IQZ) and substracted from the coefficients of the DCT. The resulting error is encoded in an entropy encoder. Both the zonal coder and the entropy encoder have quality inputs (TZQ, TEQ) controlling the compression factor, and have their outputs combined in a single compressed data stream (TXD3).

11 Claims, 2 Drawing Sheets

IMAGE PROCESSING SYSTEM

TECHNICAL FIELD

The present invention relates to an image processing system with at least a transmitter circuit and a receiver circuit, said transmitter circuit including means producing a block of signals relating to image elements of a segment or block of an image, a transform circuit to transform each of said blocks of signals into a set of substantially uncorrelated coded coefficients, and a coefficient encoder to encode each of said coded coefficients in a compressed variable bit code, and said receiver circuit being able to reconstruct said image block from the thus obtained compressed code coefficients.

BACKGROUND ART

Such an image processing system is already known in the art, e.g. from the article "Adaptive Coding of Monochrome and Color Images", by Wen-Hsiung Chen et al, published in the IEEE transactions on communications, Vol. COM-25, No. 11, November 1977, pp. 1285 to 1292.

Therein the transform circuit performs a Discrete Cosine Transform and thereby provides for each block of image elements a matrix of coded coefficients which are function of the frequency content of the image block. The coefficient encoder used is a so-called zonal encoder which uses less bits for encoding coefficients representing the higher frequency content of the image block than for encoding coefficients representing the lower frequency content thereof, in accordance with the fact that higher frequency coefficients have statistically lower variances and vice-versa.

As is well known in the art, zonal coding has a relatively low sensitivity to errors occurring in the transmission of the compressed code coefficients to the receiver. However, to reach a predetermined quality of a reconstructed image in the receiver it requires the use of a compressed code having a number of bits which is larger than that which would be required if use were made of entropy coding to code the coefficients, i.e. if compressed codes were used whose number of bits is function of the probability of occurrence of these coefficients. Indeed, it is also well known in the art that entropy encoding allows the use of codes with maximum compression. However, it has the disadvantage of being very sensitive to coding errors.

DISCLOSURE OF INVENTION

An object of the present invention is to provide an image processing system of the above type but allowing the coefficient encoder to perform a higher compression than in zonal coding for reaching a predetermined image quality.

According to the invention this object is achieved due to the fact that said transmitter circuit further includes an error determining circuit for determining the error value produced by said coefficient encoder on each of said compressed code coefficients, and an error encoder for encoding said error value according to a variable bit code, said receiver being able to correct each of said compressed code coefficients by means of the corresponding error value.

By processing in this way each compressed code coefficient is corrected by means of the corresponding coded error value, so that the resultant compressed code coefficient is as accurate as if it were provided by a higher quality coefficient encoder i.e. performing a smaller compression. Considered differently, to reach a predetermined image quality by proceeding in the way described above the coefficient encoder is allowed to perform a higher compression than without the use of an error determining circuit.

Another characteristic feature of the present invention is that said error encoder is an entropy encoder wherein each error value is encoded with a compressed code whose number of bits is function of the probability of occurrence of the error value.

Because an entropy encoder allows a maximum compression the number of bits added by the use of the error encoder is restricted to a minimum. On the other hand, the adverse effect of the well known sensitivity to faults of an entropy coder is limited here since a fault only affects the error value itself. Moreover it has been found that such a fault has no adverse effect on the quality for the viewer of the image reconstructed in the receiver.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

The present image processing system for instance forms part of an Asynchronous Transfer Mode (ATM) system including a switching network to which a plurality of subscriber stations have access and wherein information is transmitted in an asynchronous way under the form of cells or packets. The transmitter circuit TX and the receiver circuit RX shown form part of two different subscriber stations.

Figure 1:
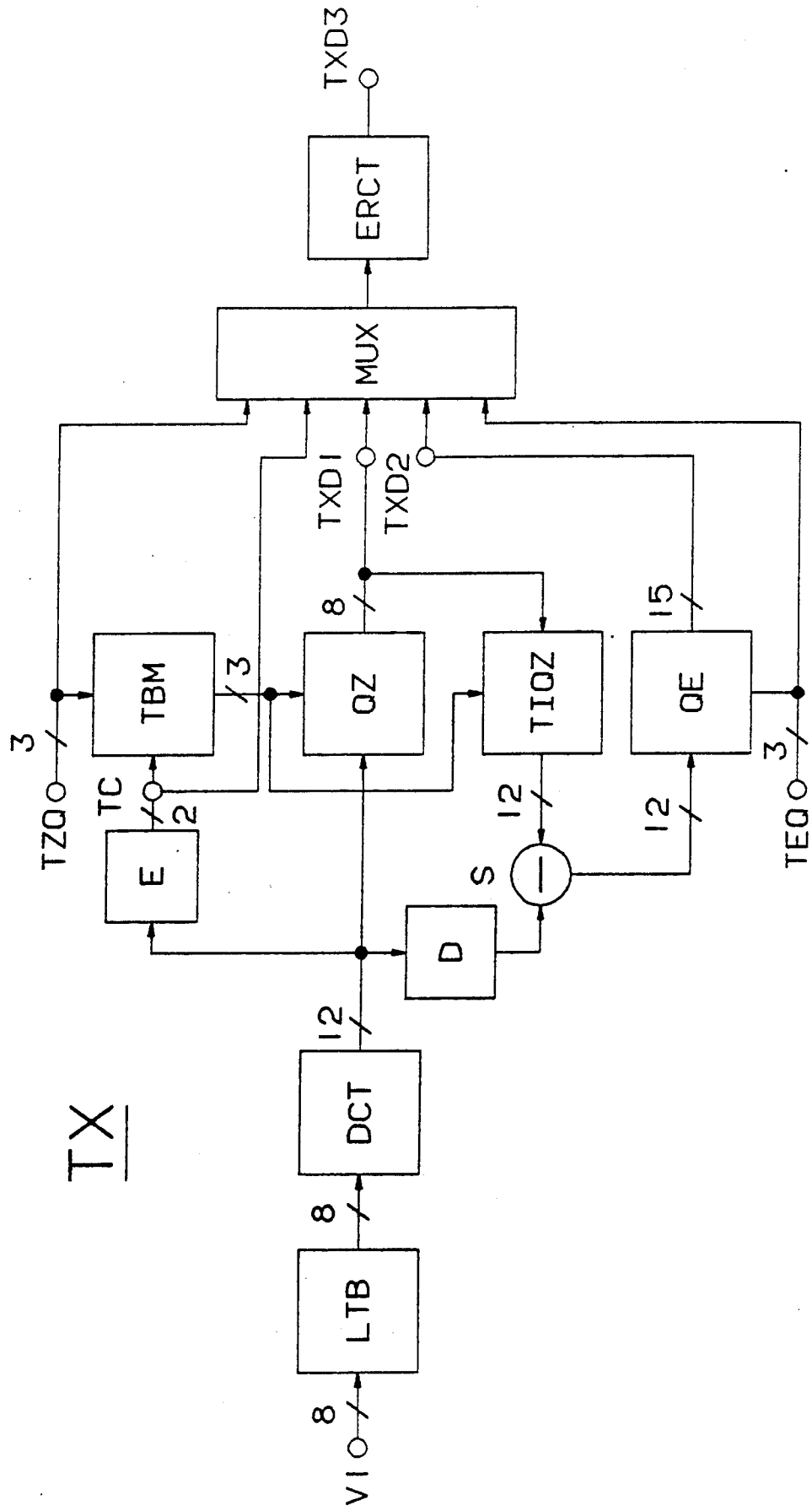
FIG. 1 is a schematic diagram of a transmitter circuit TX of an image processing system according to the invention.

Principally referring to FIG. 1, the transmitter circuit TX shown therein has a signal input V1, two control inputs TZQ and TEQ and an output TXD3 and includes a line-to-block circuit LTB, a Discrete Cosine Transform circuit DCT, a zonal encoder circuit QZ, an entropy encoder circuit QE, an energy measurement circuit E, an inverse zonal encoder circuit TIQZ, a bit allocation map circuit TBM, a subtractor circuit S, a delay circuit D, a multiplexer circuit MUX and a packetizer circuit ERCT. All these circuits are interconnected as shown and because they are well known in the art they are not shown in detail. Some of these circuits are described and shown in the above mentioned article and in the article "Entropy Coded Differential Pulse-Code Modulation Systems for Television" by Shri K. Goyal et al, IEEE Transactions on Communications, June 1975, pp. 660–666.

The line-to-block circuit LTB has an input V1 to which is applied a video signal built up in accordance with CCIR specification No 656 and having a rate of 27 Megawords per second. This signal is constituted by a stream of multiplexed luminance and chrominance 8-bit data words each representing the digital value of a luminance or chrominance analog sample of an image or picture element (pixel). The successive data words of the stream relate to successive pixels of successive lines of each image.

Because the processing of the luminance and chrominance data words is similar only the processing of the luminance data words is considered in relative detail hereinafter.

In the line-to-block circuit LTB the 8-bit luminance input data words are assembled in blocks or groups, each containing the luminance data words relating to $8 \times 8$ pixels of a segment or block of an image. As is well known the data words of such a block are correlated.

The correlated data words of each such a block are applied to a Discrete Cosine Transform circuit DCT and transformed therein into a matrix of $8 \times 8$ uncorrelated 12-bit linear code coefficients representing the frequency content of the image block. The position of the coefficients in the matrix shifts from left to right and from top to bottom for increasing frequencies. More particularly the upper left coefficients of such a block is function of the DC luminance level or brightness of the image block. Considered over a long time interval the variance of the coefficient thus obtained is largest for the upper left coefficients and decreases for increasing frequencies, i.e. from left to right and from top to bottom in each block.

The $8 \times 8$ 12-bit linear code coefficients of each block provided by the circuit DCT are supplied in parallel to the zonal encoder QZ, to an input of the subtractor S via the delay circuit D and via the energy measurement circuit E to the input TC of the bit allocation map circuit TBM. The latter stores 32 bit maps which are function of the variance of the coded coefficients and which are subdivided in 4 classes of 8 quality levels. Each bit map is constituted by 3 bits, thus allowing to define 8 possible values. Each such value indicates the compressed code of 0 to 7 bits wherein the 12-bit linear code coefficients supplied to the encoder QZ have to be encoded.

The energy measurement circuit E measures the energy content (related to the image activity level) of each image block from the coded coefficients provided at the output of the DCT and accordingly provides a 2-bit class control signal TC which allows the selection of one of the 4 possible classes of bit maps in the TBM. The selection of one of the 8 bit maps in each class is performed under the control of a 3-bit quality control signal TZQ applied to the like named input terminal TZQ.

To be noted that the values stored in the 32 maps of the TBM decrease/increase with decreasing/increasing measured energy and with decreasing/increasing quality level.

The zonal encoder QZ encodes each of the 12-bit linear code coefficients applied to its input into a compressed 0-bit to 7-bit code indicated by the control value provided by the TBM. This means that the encoder compresses the 12-bit code coefficients in function of the variance, the activity and the quality levels, the compression being higher for lower variance, lower activity and lower quality.

A lower/higher variance activity or quality level has for effect that the 0-bit to 7-bit coefficients at the output of the encoder QZ have a larger/smaller residual error value when compared with the 12-bit coefficient at the input of this encoder. This error value is measured in a measurement circuit which comprises the delay circuit D, the inverse encoder TIQZ and the subtractor S. More particularly, the coefficients provided by the encoder QZ are supplied to the input of TIQZ which is also controlled by the output of TBM. The output signals of TIQZ and of DCT, via a delay provided by delay circuit D, are applied to the respective inputs of the subtractor S. In this way the 0-bit to 7-bit compressed code coefficients provided by QZ are converted into 12-bit linear code coefficients and the latter are subtracted from the delayed original 12-bit linear code coefficients provided by DCT in the subtractor S which therefore provides at its output 12-bit linear code coefficient errors.

These 12-bit linear code coefficient error signals are supplied to the entropy encoder QE which encodes each of these linear codes into a 0-bit to 15-bit compressed code depending on the required quality defined by a 3-bit quality control signal TEQ applied to the like named input TEQ. The entropy coder thereby assigns less bits to codes with less probability of occurrence and more bits to codes with more probability of occurrence, according to a predetermined statistical curve. In addition the entropy coder performs run-length coding by replacing consecutive zero's in the compressed code by a code indicating the number of zero's.

The zonal compressed code coefficient data stream TXD1 of QZ, the entropy compressed code error data stream TXD2 of QE and the above mentioned control signals TC, TZQ and TEQ are multiplexed in the multiplexer MUX. The thus obtained data stream is then packetized in the circuit ERCT which also inserts a synchronizing code, an error correction code and a packet sequence code. Afterwards the packetized data is transmitted to the ATM switching network mentioned above via the output TXD3.

Figure 2:
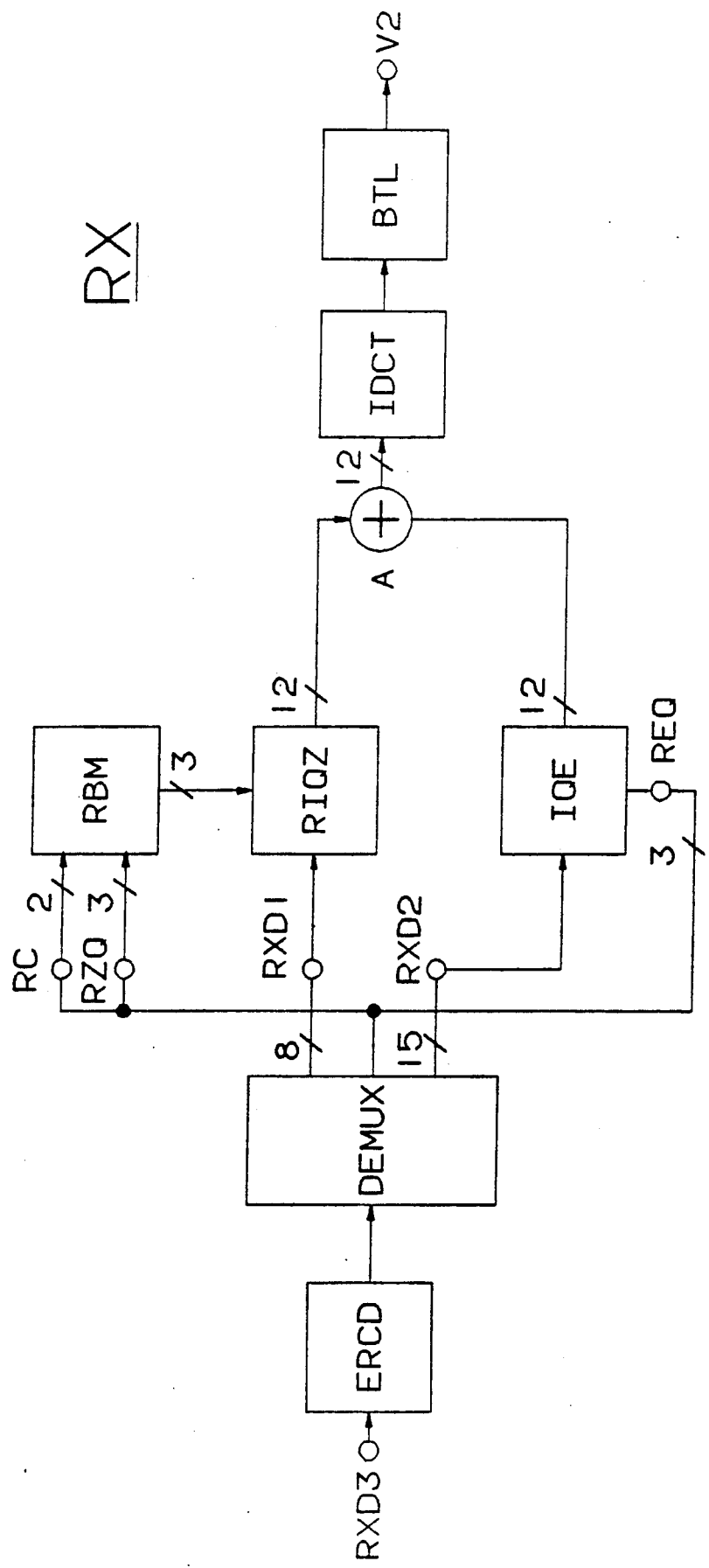
FIG. 2 is a schematic diagram of a receiver circuit RX of this system.

Reference is now made to FIG. 2 which shows a receiver RX. This receiver includes an error correcting and detecting circuit ERCD, a demultiplexer circuit DEMUX, a receiver bit allocation map circuit RBM, an inverse zonal encoder RIQZ, an inverse entropy encoder IQE, an Inverse Discrete Cosine Transform circuit IDCT, a block-to-line converter BTL and an adder circuit A. All these circuits are interconnected as shown and are not represented in detail because they are well known in the art.

The above mentioned output data stream provided at the output TXD3 of the transmitter TX is supposed to be received at the input RXD3 of the receiver RX and more particularly at the input of the error correcting and detecting circuit ERCD. The corrected data stream obtained at the output of ERCD is demultiplexed in the demultiplexer circuit DEMUX which provides at its output the compressed code coefficient data stream RXD1 corresponding to TXD1, the compressed code error data stream RXD2 corresponding to TXD2 and the control signals RC, RZQ and REQ corresponding to TC, TZQ and ZEQ respectively.

The class control signal RC and the quality signal RZQ are fed to the receiver bit allocation map circuit RBM which is similar to TBM. As a consequence one of the 32 3-bit allocation maps is selected and the 3-bit value stored therein is applied to the control input of the inverse zonal encoder RIQZ, to the signal input of which the coefficient data stream RXD1 is supplied. The 0-bit to 7-bit coefficient codes of this data stream are inversely encoded to 12-bit coefficient codes and these are supplied to one input of the adder circuit A.

The entropy 0-bit to 15-bit code error data stream RXD2 is decoded in the inverse encoder IQE. At its output the latter provides 12-bit linear error codes and applies them to a second input of the adder circuit A. In this way the latter reconstructs the original image block coefficients, as far as there are no transmission errors and the highest qualities are chosen. These coefficients are then inversely transformed according to an Inverse Discrete Cosine Transform in the circuit IDCT. From there the transformed coefficients are applied to the block-to-line converter BTL which from these coefficients reconstructs the original input signal and supplies it at its output V2.

While the principles of the invention have been described above in connection with specific apparatus, it is to be clearly understood that this description is made only by way of example and not as a limitation on the scope of the invention.

We claim:

1. Image processing system comprising
a transmitter circuit comprising
means for producing input signals relating to image elements of a segment or block of an image,
a transform circuit for transforming said input signals into substantially uncorrelated coded coefficients,
a zonal encoder for encoding each of said coded coefficients in a compressed variable bit code to thereby form a corresponding set of compressed code coefficients with a compression that is a function of the variance of said each coded coefficient,
an error determining circuit for determining the error value produced by said zonal encoder on each of said compressed code coefficients, and
an entropy encoder for encoding each said error value in a variable bit code wherein each error value is encoded with a number of bits which is a function of the probability of occurrence of the error value, and
a receiver circuit for reconstructing said image block from the thus obtained compressed code coefficients and the thus encoded error values, said receiver comprising
means responsive to the corresponding encoded error value for correcting each of said compressed code coefficients.

2. Image processing system according to claim 1, wherein
said entropy encoder converts a series of zero's in said compressed code by a code indicating the number of zero's.

3. Image processing system according to claim 1, wherein
said error determining circuit further comprises
a subtractor circuit having a first input to which the output of said transform circuit is coupled via a delay unit,
a second input to which the output of said coefficient encoder is coupled through an inverse encoder and
an output which is coupled to an input of said entropy encoder.

4. Image processing system according to claim 1, wherein
said transform circuit performs a discrete cosine transform.

5. Image processing system according to claim 1, wherein
said entropy encoder is also controlled by a second quality control selection parameter, defining the entropy encoder characteristics.

6. Image processing system according to claim 1, wherein
said compressed code is also a function of the energy content or image activity of said image block.

7. Image processing system according to claim 6, wherein
said compressed code is also a function of a first quality selection parameter.

8. Image processing system according to claim 7 wherein
said transmitter circuit further comprises
a bit map circuit coupled to a control input of said coefficient encoder for storing a series of bit maps that are a function of the variance of the coded coefficients, each of said bit maps being constituted by a value with which said coefficient encoder has to perform code compression, and
the output of said transform circuit is coupled through an energy measuring circuit with a first map selection input of said bit map circuit having a second map selection input which is controlled by said first quality selection parameter.

9. Image processing system according to claim 8, wherein
said error determining circuit further comprises
a subtractor circuit having a first input to which the output of said transform circuit is coupled via a delay unit,
a second input to which the output of said coefficient encoder is coupled through an inverse encoder and
an output which is coupled to an input of said entropy encoder, and
the output of said bit map circuit also controls an input of said inverse encoder.

10. Image processing system according to claim 8, wherein
said entropy encoder is also controlled by a second quality control selection parameter, defining the entropy encoder characteristics, and
the output of said coefficient encoder, the output of said entropy encoder, the output of said energy measuring circuit, and said first and said second quality selection parameters are supplied to a packetizer circuit through a multiplexer circuit, said packetizer circuit transmitting the thus packetized information on a packet switching network.

11. Image processing system according to claim 10, wherein
said receiver circuit further comprises
means for deriving said compressed code coefficients and said compressed code errors from said packetized information,
means for converting said compressed code coefficients and said compressed code errors into linear code coefficients and errors,
means for adding each error to its corresponding code coefficient to obtain a corrected code coefficient, and
means for deriving an image from the thus corrected code coefficients.

* * * * *